US009547698B2

(12) United States Patent
Jain et al.

(10) Patent No.: US 9,547,698 B2
(45) Date of Patent: Jan. 17, 2017

(54) DETERMINING MEDIA CONSUMPTION PREFERENCES

(71) Applicant: Google Inc., Mountain View, CA (US)

(72) Inventors: Ankit Jain, Milpitas, CA (US); Wei Chai, Union City, CA (US); Anna Patterson, Saratoga, CA (US); Jindong Chen, Hillsborough, CA (US)

(73) Assignee: GOOGLE INC., Mountain View, CA (US)

( * ) Notice: Subject to any disclaimer, the term of this patent is extended or adjusted under 35 U.S.C. 154(b) by 495 days.

(21) Appl. No.: 13/868,504

(22) Filed: Apr. 23, 2013

(65) Prior Publication Data

US 2014/0317098 A1   Oct. 23, 2014

(51) Int. Cl.
  *G06F 17/30* (2006.01)
  *G06Q 30/02* (2012.01)
  *G06Q 30/06* (2012.01)

(52) U.S. Cl.
  CPC ..... *G06F 17/30554* (2013.01); *G06Q 30/0255* (2013.01); *G06Q 30/0631* (2013.01)

(58) Field of Classification Search
  CPC .................... G06F 17/30554; G06Q 30/0255; G06Q 30/0631
  See application file for complete search history.

(56) References Cited

U.S. PATENT DOCUMENTS

| 6,289,353 B1 | 9/2001 | Hazlehurst et al. |
| 6,757,691 B1 | 6/2004 | Welsh et al. |
| 6,782,370 B1 | 8/2004 | Stack |
| 7,113,917 B2 | 9/2006 | Jacobi et al. |
| 7,328,216 B2 | 2/2008 | Hofmann et al. |
| 7,424,469 B2 | 9/2008 | Ratnaparkhi |
| 7,424,486 B2 | 9/2008 | Whitman |
| 7,533,091 B2 | 5/2009 | Plastina et al. |

(Continued)

FOREIGN PATENT DOCUMENTS

| JP | 2011221608 A | 11/2011 |
| WO | 2012117278 A2 | 9/2012 |

OTHER PUBLICATIONS

International Search Report and Written Opinion in PCT/US2014/034921 mailed Oct. 2, 2014.

(Continued)

*Primary Examiner* — Huawen A Peng
(74) *Attorney, Agent, or Firm* — Morris & Kamlay LLP

(57) ABSTRACT

Systems and methods are disclosed for determining media consumption preferences. A method may include accessing media consumption history associated with a user. The media consumption history may include at least one of media purchase history of the user, media viewing history of the user, and media listening history of the user. A media category preference of the user may be determined, based on the media consumption history. The media category preference may include a popularity indication for each of a plurality of media categories of media items in the media consumption history. Search results provided in response to a search query by the user and/or media recommendations prepared for the user may be scored based on the media category preference. The media may include a video, a movie, a TV show, a book, an audio recording, a music album and/or another type of digital media.

14 Claims, 4 Drawing Sheets

(56) References Cited

U.S. PATENT DOCUMENTS

| | | | |
|---|---|---|---|
| 7,603,348 B2 | 10/2009 | He et al. | |
| 7,657,523 B2 | 2/2010 | Ebanks | |
| 7,693,865 B2 | 4/2010 | Lu et al. | |
| 7,720,720 B1 | 5/2010 | Sharma et al. | |
| 8,090,621 B1 | 1/2012 | Chakrabarti et al. | |
| 8,122,031 B1 | 2/2012 | Mauro et al. | |
| 8,166,026 B1 | 4/2012 | Sadler | |
| 8,166,029 B2 | 4/2012 | Park et al. | |
| 8,180,768 B2 | 5/2012 | Ceri | |
| 8,200,674 B2 | 6/2012 | Burba et al. | |
| 8,219,134 B2 | 7/2012 | Maharajh et al. | |
| 8,244,848 B1 | 8/2012 | Narayanan et al. | |
| 8,290,983 B2 | 10/2012 | Meyer et al. | |
| 8,301,484 B1 * | 10/2012 | Kumar | G06Q 30/00 705/7.29 |
| 8,370,351 B2 | 2/2013 | Kalasapur et al. | |
| 8,429,691 B2 | 4/2013 | Jensen | |
| 8,577,753 B1 | 11/2013 | Vincent et al. | |
| 8,589,429 B1 | 11/2013 | Thirumalai et al. | |
| 8,620,919 B2 | 12/2013 | Gates et al. | |
| 8,626,911 B2 | 1/2014 | Konig et al. | |
| 8,630,992 B1 | 1/2014 | Berry et al. | |
| 8,688,726 B2 | 4/2014 | Mahajan et al. | |
| 8,700,544 B2 | 4/2014 | Sontag et al. | |
| 8,732,101 B1 | 5/2014 | Wilson et al. | |
| 8,762,847 B2 | 6/2014 | Svendsen | |
| 8,789,108 B2 | 7/2014 | Gibbs et al. | |
| 8,856,833 B2 | 10/2014 | Conness | |
| 8,874,574 B2 | 10/2014 | Purdy | |
| 2003/0200157 A1 | 10/2003 | Krajec | |
| 2004/0133571 A1 | 7/2004 | Horne | |
| 2005/0027670 A1 | 2/2005 | Petropoulos et al. | |
| 2005/0071328 A1 | 3/2005 | Lawrence et al. | |
| 2005/0278317 A1 | 12/2005 | Gross et al. | |
| 2006/0200460 A1 | 9/2006 | Meyerzon et al. | |
| 2006/0218156 A1 | 9/2006 | Schechinger et al. | |
| 2007/0011039 A1 | 1/2007 | Oddo | |
| 2007/0061333 A1 | 3/2007 | Ramer et al. | |
| 2007/0186243 A1 | 8/2007 | Pettit et al. | |
| 2007/0266025 A1 | 11/2007 | Wagner et al. | |
| 2008/0059454 A1 | 3/2008 | Andrieu et al. | |
| 2008/0077574 A1 | 3/2008 | Gross | |
| 2008/0097821 A1 | 4/2008 | Chickering et al. | |
| 2009/0055384 A1 | 2/2009 | Jain et al. | |
| 2009/0138457 A1 | 5/2009 | Askey et al. | |
| 2010/0153324 A1 | 6/2010 | Downs et al. | |
| 2010/0153357 A1 | 6/2010 | Slackman et al. | |
| 2010/0153370 A1 | 6/2010 | Gollapudi et al. | |
| 2010/0306249 A1 | 12/2010 | Hill et al. | |
| 2011/0238675 A1 | 9/2011 | Schachter et al. | |
| 2011/0282821 A1 | 11/2011 | Levy et al. | |
| 2011/0320441 A1 | 12/2011 | Lee et al. | |
| 2012/0036523 A1 | 2/2012 | Weintraub et al. | |
| 2012/0101806 A1 | 4/2012 | Davis et al. | |
| 2012/0117057 A1 | 5/2012 | Adimatyam et al. | |
| 2012/0130998 A1 | 5/2012 | Varadarajan et al. | |
| 2012/0166432 A1 | 6/2012 | Tseng | |
| 2012/0166438 A1 | 6/2012 | Wu et al. | |
| 2012/0174159 A1 | 7/2012 | Arte et al. | |
| 2012/0179693 A1 | 7/2012 | Knight et al. | |
| 2012/0221687 A1 | 8/2012 | Hunter et al. | |
| 2013/0024448 A1 | 1/2013 | Herbrich et al. | |
| 2013/0046781 A1 | 2/2013 | Frankel et al. | |
| 2013/0054582 A1 | 2/2013 | Macklem et al. | |
| 2013/0073473 A1 * | 3/2013 | Heath | G06Q 30/02 705/319 |
| 2013/0086057 A1 | 4/2013 | Harrington et al. | |
| 2013/0110827 A1 | 5/2013 | Nabar et al. | |
| 2013/0218803 A1 | 8/2013 | Whittle et al. | |
| 2013/0339345 A1 | 12/2013 | Soto Matamala et al. | |
| 2014/0136554 A1 | 5/2014 | Moradi et al. | |
| 2014/0195506 A1 | 7/2014 | Perlegos et al. | |
| 2014/0215506 A1 | 7/2014 | Kalmes et al. | |
| 2014/0223480 A1 | 8/2014 | Berry et al. | |
| 2014/0280214 A1 | 9/2014 | Han et al. | |

OTHER PUBLICATIONS

International Preliminary Report on Patentability for International Application No. PCT/US2014/034869, mailed Nov. 5, 2015.
International Preliminary Report on Patentability for International Application No. PCT/US2014/034871, mailed on Nov. 5, 2015.
International Preliminary Report on Patentability for International Application No. PCT/US2014/034958, mailed Nov. 5, 2015.
International Search Report and Written Opinion for Application No. PCT/US2014/034869 mailed Oct. 27, 2014.
International Search Report and Written Opinion in Application No. PCT/US2014/034871 mailed Nov. 3, 2014.
International Search Report and Written Opinion issued Oct. 31, 2014 in corresponding International Application No. PCT/US2014/034958.
"Sproose Selects Blinkx to Power Video Search", Feb. 20, 2007, 2 pgs.

* cited by examiner

DETERMINING MEDIA CONSUMPTION PREFERENCES

CROSS-REFERENCE TO RELATED APPLICATIONS

This patent application also makes reference to:

U.S. patent application Ser. No. 13/868,341, titled "LIVE RECOMMENDATION GENERATION," and filed on the same date as this application; and U.S. patent application Ser. No. 13/868,533, titled "PERSONALIZED DIGITAL CONTENT SEARCH," and filed on the same date as this application.

The above stated applications are hereby incorporated herein by reference in their entirety.

BACKGROUND

Information retrieval systems (i.e., search systems) as well as recommendation systems are widely integrated and used by most websites and digital content stores. An information retrieval system uses terms and phrases to index, retrieve, organize and describe documents. When a user enters a search query, the terms in the query are identified and used to retrieve documents from the information retrieval system, and then rank them. However, conventional search systems are rarely personalized and provide the same search results to all users. Additionally, conventional recommendation systems provide recommendations primarily based on the individual items that a user has previously purchased/browsed.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for determining media consumption preferences, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

In accordance with an example embodiment of the disclosure, a method for determining media consumption preferences may include accessing media consumption history associated with a user. The media consumption history may include at least one of media purchase history of the user and media viewing history of the user. A media category preference of the user may be determined, based on the media consumption history. The media category preference may include a popularity indication for each of a plurality of media categories of media items in the media consumption history. Search results provided in response to a search query by the user and/or media recommendations prepared for the user may be scored based on the media category preference.

In accordance with another example embodiment of the disclosure, a method for determining media consumption preferences may include accessing media consumption history associated with a user. The media consumption history may include at least one of media purchase history of the user and media viewing history of the user. A media language preference of the user may be determined, based on the media consumption history. The media language preference may include a popularity indication for each of a plurality of languages of the media items in the media consumption history. Search results provided in response to a search query by the user and/or media recommendations prepared for the user may be scored based on the media language preference.

DETAILED DESCRIPTION

Figure 1:
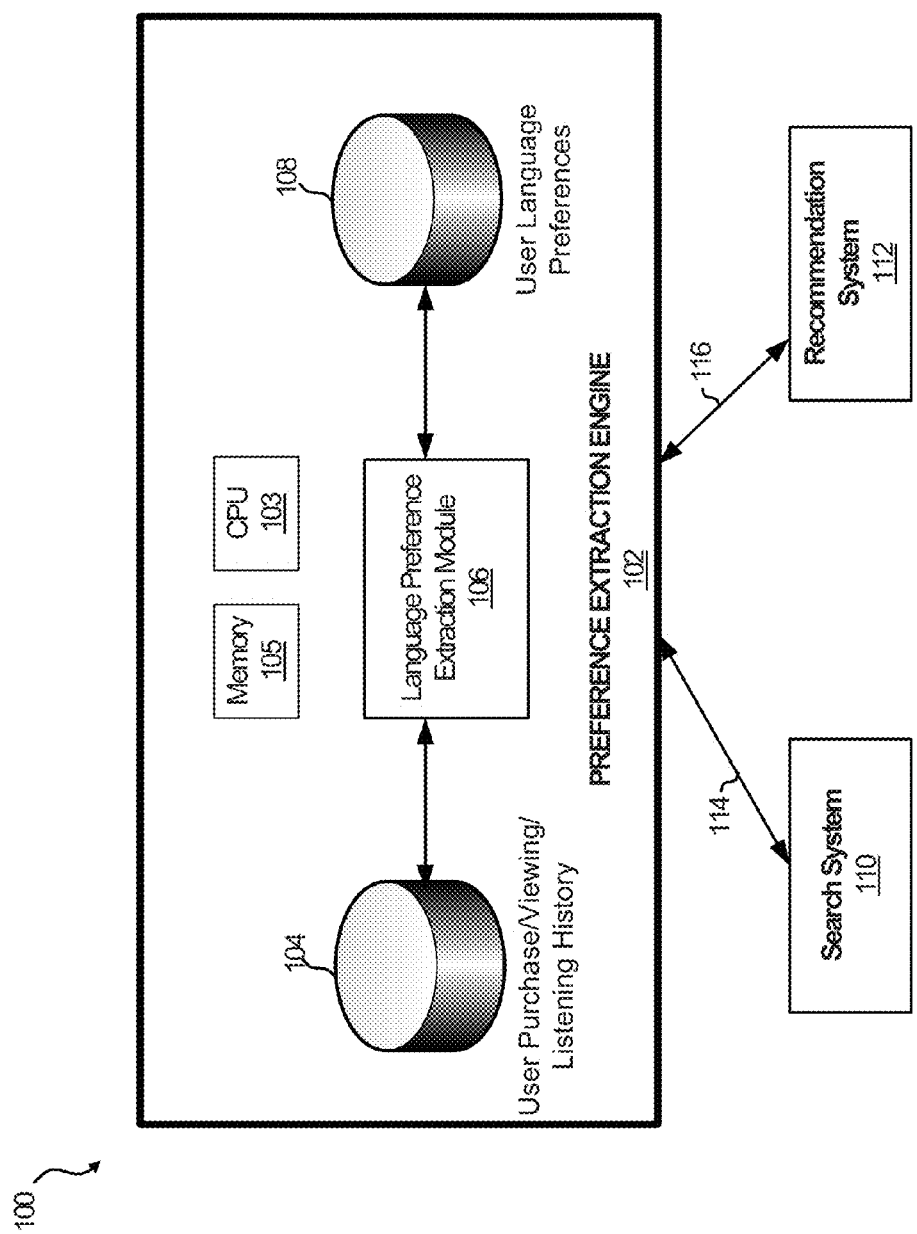
FIG. 1 is a block diagram illustrating an example language preference extraction system, in accordance with an example embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations.

As used herein, the term "corpus" (plural, "corpora") means a collection of documents (or data items) of a given type. As used herein, the term "WWW-based search corpora" or "WWW-based corpora" is corpora meant to include all documents available on the Internet (i.e., including, but not limited to, music-related documents, book-related documents, movie-related documents and other media-related documents). The term "non-WWW corpus" or "non WWW-based corpus" means a corpus where the corpus documents (or data items) are not available on the WWW. The term "small" corpora may indicate corpora including at least one corpus that is a subset of the WWW-based (or web-based) corpora, or at least one corpus that is partially or completely non-overlapping with the web-based corpora. An example of "small" corpora may include corpora associated with an online media search engine. The "small" corpora may include, for example, a movie corpus (associated with a movie search engine), music corpus (associated with a music search engine), etc. Additionally, portions of the music and/or movies database may be available via an Internet search of the WWW-based corpora (i.e., such portions of the respective corpus are a subset of the WWW-based corpora), while other portions of the "small" corpora may not be available on the WWW-based corpora and are, therefore, non-overlapping with the WWW-based corpora. The term "non-overlapping corpus" (e.g., a first corpus is non-overlapping with a second corpus), means that documents that may be found in one corpus, may not be found in the other corpus.

As used herein the term "media" or "digital media" refers to any type of digital media documents (or items) available for purchase/download and consumption by a user. Non-limiting examples of digital media include videos, movies, TV shows, books, magazines, newspapers, audio recordings, music albums, comics, and other digital media.

The systems and methods described herein may be used to improve the quality of the retrieved searches and recommendations generated by digital content information retrieval systems and recommendation systems, respectively. For example, a preference extraction system may initially determine a user's category/genre preferences and/or language preferences (or any other type of preferences associated with consumption of digital media). The extracted data may then be used in information retrieval and/or personalized recommendation systems for personalizing the results presented to a user.

In the context of an example search, a user who searches for "free games" may be presented with results for "board games" if their past purchases show an interest in board games. A user who searches for "action movies" may be presented with results showing action movies which also have a bit of romance, if the user has a history of liking romantic films as well (e.g., based on previous viewing history). Additionally, a user who searches for "foreign films" may be presented with results for Russian films if their past digital media purchases show interest in media presented in Russian.

Additional information regarding systems and methods for personalized digital content searches is disclosed in a related U.S. patent application Ser. No. 13/868,533, filed on even date herewith and titled "PERSONALIZED DIGITAL CONTENT SEARCH".

Additional information regarding systems and methods for using a scatter gather information retrieval system for live recommendation generation is disclosed in a related U.S. patent application Ser. No. 13/868,341, titled "LIVE RECOMMENDATION GENERATION," and filed on the same date as this application.

FIG. 1 is a block diagram illustrating an example language preference extraction system, in accordance with an example embodiment of the disclosure. Referring to FIG. 1, the example preference extraction engine 102 may comprise a user purchase/viewing/listening history database 104, a language preference extraction module 106, a user language preferences database 108, a CPU 103, and memory 105. The preference extraction engine 102 may also be communicatively coupled to a search system 110 and/or a recommendation system 112.

The user purchase/viewing/listening history database 104 may comprise suitable circuitry, logic and/or code and may be operable to provide information relevant to a user's purchase or viewing history associated with digital media items (e.g., videos, books, TV shows, movies, apps, or other digital media).

The language preference extraction module 106 may comprise suitable circuitry, logic and/or code and may be operable to extract one or more language preferences associated with a user. More specifically, the language preference extraction module 106 may determine a popularity indication for each of a plurality of languages used for presenting a given type of media (e.g., language a movie is presented or subtitled in, language a TV show or a video is presented in, language a book is written in, etc.). The popularity indication for a given language may be measured based on a number of digital media items in the given language, consumed by the user (as indicated by the user's purchase/viewing/listening history in the database 104). The language preference extraction module 106 may select as the user's media language preference, one or more of the languages with a highest popularity indication.

The user language preference database 108 may comprise suitable circuitry, logic and/or code and may be operable to store one or more language preferences associated with a corresponding user, where the one or more language preferences may be received from the language preference extraction module 106. The language preferences may indicate one or more "preferred" languages (e.g., information on what languages the user prefers for a given media, or what proportion of multiple languages the user prefers), as well as one or more languages that the user is not familiar with and does not prefer to use in any of the digital media presented from a search or recommendation engine.

In operation, the language preference extraction module 106 may access the user purchase/viewing/listening history database 104 and may determine for a given user, a popularity indication for each of a plurality of languages used for presenting a given type of media (e.g., language a movie is presented or subtitled in, language a TV show or a video is presented in, language a book is written in, etc.) to the user. The language preference extraction module 106 may select as the user's media language preference one or more of the languages with a highest popularity indication (e.g., may select one top-ranked language, multiple languages that the user prefers to use based on the type of digital media consumed, or multiple languages ranked based on a proportion of the popularity indicators of the several of the top-ranked languages). The language preference extraction module 106 may then store the determined media language preference(s) associated with the user in the user language preference database 108.

The search system 110 may comprise suitable circuitry, logic and/or code and may be operable to generate one or more search results in response to a search query by a user. During ranking of the search results, the search system 110 may receive user language preferences from the preference extraction engine 102 via communication path 114 (wired and/or wireless). The user language preference may be used as personalized score for purposes of ranking the final search results prior to presenting them to the user.

The recommendation system 112 may comprise suitable circuitry, logic and/or code and may be operable to generate one or more recommendations for digital media items that may be of interest to a user. During ranking of the recommendation results, the recommendation system 112 may receive user language preferences from the preference extraction engine 102 via communication path 116 (wired and/or wireless). The user language preference may be used as personalized score for purposes of ranking the final recommendation results prior to presenting them to the user.

Even though the user purchase/viewing/listening history database 104, the language preference extraction module 106, and the user language preferences database 108 are all illustrated as part of the preference extraction engine 102, the present disclosure may not be limited in this regard. More specifically, one or more of the user purchase/viewing/listening history database 104, the language preference extraction module 106, and/or the user language preferences database 108 may be implemented separately from the preference extraction engine 102. Additionally, the preference extraction engine 202 may be implemented as part of the search system 110 and/or the recommendation system 112.

Figure 2:
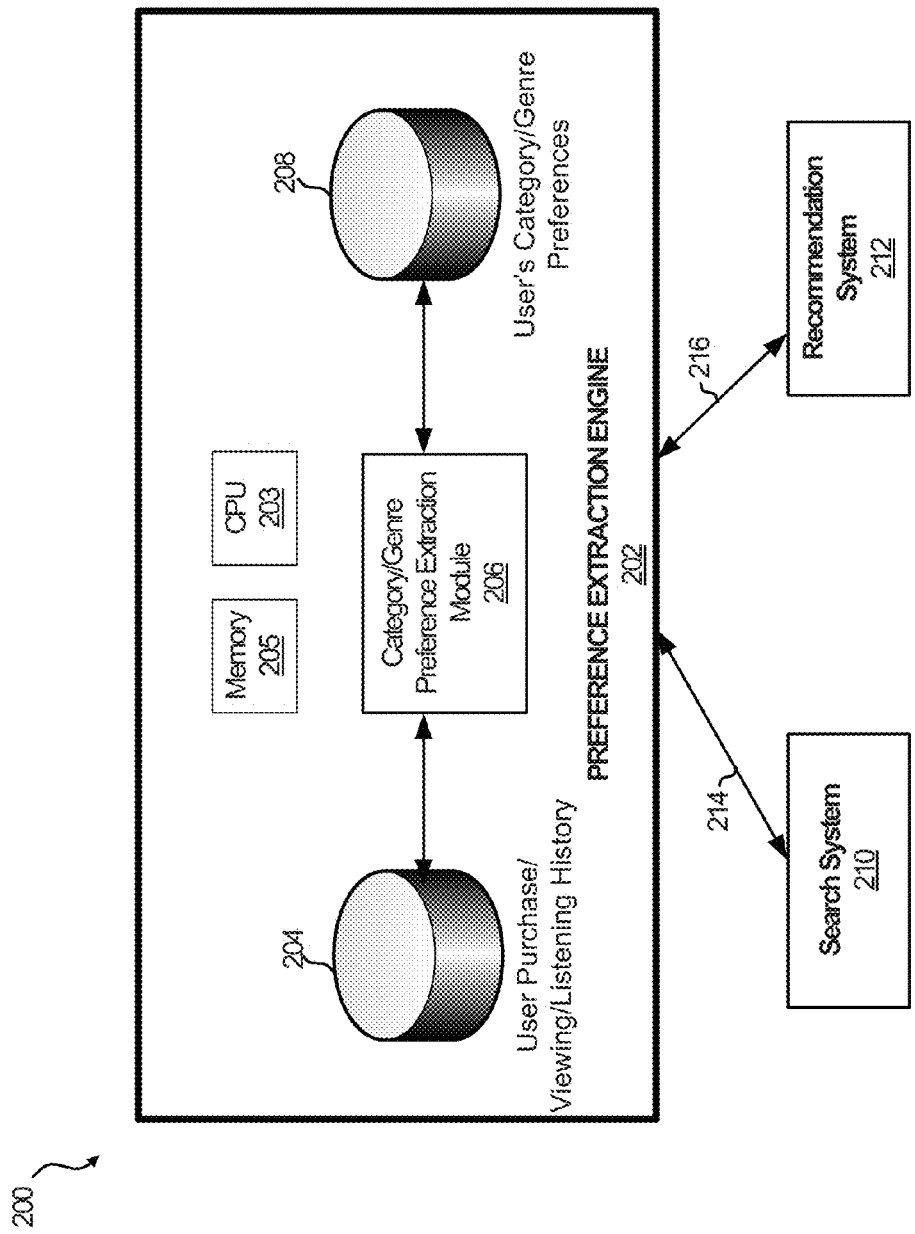
FIG. 2 is a block diagram illustrating an example category/genre preference extraction system, in accordance with an example embodiment of the disclosure.

FIG. 2 is a block diagram illustrating an example category/genre preference extraction system, in accordance with an example embodiment of the disclosure. Referring to FIG. 2, the example preference extraction engine 202 may comprise a user purchase/viewing/listening history database 204, a category/genre preference extraction module 206, a user category/genre preferences database 208, a CPU 203, and memory 205. The preference extraction engine 202 may also be communicatively coupled to a search system 210 and/or a recommendation system 212.

The user purchase/viewing/listening history database 104 may comprise suitable circuitry, logic and/or code and may be operable to provide information relevant to a user's purchase or viewing history associated with digital media items (e.g., videos, books, TV shows, movies, apps, or other digital media).

The category/genre preference extraction module 206 may comprise suitable circuitry, logic and/or code and may be operable to extract one or more category and/or genre preferences associated with a user. More specifically, the category/genre preference extraction module 206 may determine a popularity indication for each of a plurality of categories and/or genres used for classifying a given type of media (e.g., a movie, a TV show, a book, etc.). The popularity indication for a given category and/or genre may be measured based on a number of digital media items in the given category/genre, consumed by the user (as indicated by the user's purchase/viewing/listening history in the database 204). The category/genre preference extraction module 206 may select as the user's media category/genre preference, one or more of the categories and/or genres with a highest popularity indication.

The user category/genre preference database 208 may comprise suitable circuitry, logic and/or code and may be operable to store one or more category/genre preferences associated with a corresponding user, where the one or more category/genre preferences may be received from the category/genre preference extraction module 206. The category/genre preferences may indicate one or more "preferred" media categories and/or media genre (e.g., information on what category/genre the user prefers for a given media, or what proportion of multiple category/genre the user prefers), as well as one or more category/genre of media that the user does not prefer to use/consume for any of the digital media presented to the user from a search or recommendation engine.

In operation, the category/genre preference extraction module 206 may access the user purchase/viewing/listening history database 204 and may determine for a given user, a popularity indication for each of a plurality of media categories and/or media genres used for presenting a given type of media to the user. The category/genre preference extraction module 206 may select as the user's media category/genre preference one or more of the categories and/or genres with a highest popularity indication (e.g., may select one top-ranked category/genre, multiple categories/genres that the user prefers based on the type of digital media consumed, or multiple categories/genres ranked based on a proportion of the popularity indicators of the several of the top-ranked categories/genres). The category/genre preference extraction module 206 may then store the determined media category/genre preference(s) associated with the user in the user category/genre preference database 108.

The search system 210 may comprise suitable circuitry, logic and/or code and may be operable to generate one or more search results in response to a search query by a user. During ranking of the search results, the search system 210 may receive user category/genre preferences from the preference extraction engine 202 via communication path 214 (wired and/or wireless). The user category/genre preference may be used as personalized score for purposes of ranking the final search results prior to presenting them to the user.

The recommendation system 212 may comprise suitable circuitry, logic and/or code and may be operable to generate one or more recommendations for digital media items that may be of interest to a user. During ranking of the recommendation results, the recommendation system 212 may receive user category/genre preferences from the preference extraction engine 202 via communication path 216 (wired and/or wireless). The user category/genre preference may be used as personalized score for purposes of ranking the final recommendation results prior to presenting them to the user.

Even though the user purchase/viewing/listening history database 204, the category/genre preference extraction module 206, and the user category/genre preferences database 208 are all illustrated as part of the preference extraction engine 202, the present disclosure may not be limited in this regard. More specifically, one or more of the user purchase/viewing/listening history database 204, the category/genre preference extraction module 206, and/or the user category/genre preferences database 208 may be implemented separately from the preference extraction engine 202. Additionally, the preference extraction engine 202 may be implemented as part of the search system 110 and/or the recommendation system 112.

Even though FIGS. 1-2 illustrate a language preference extraction engine and a category/genre preference extraction engine, respectively, such illustrations are simply for providing an example and are not limiting the disclosure in any way. More specifically, other preference extraction engines may also be used to extract other types of user preferences (e.g., spending preferences; user X likes to spend more on Fridays than on Mondays, etc.), and use the extracted user preference(s) in search and/or recommendation engines.

Figure 3:
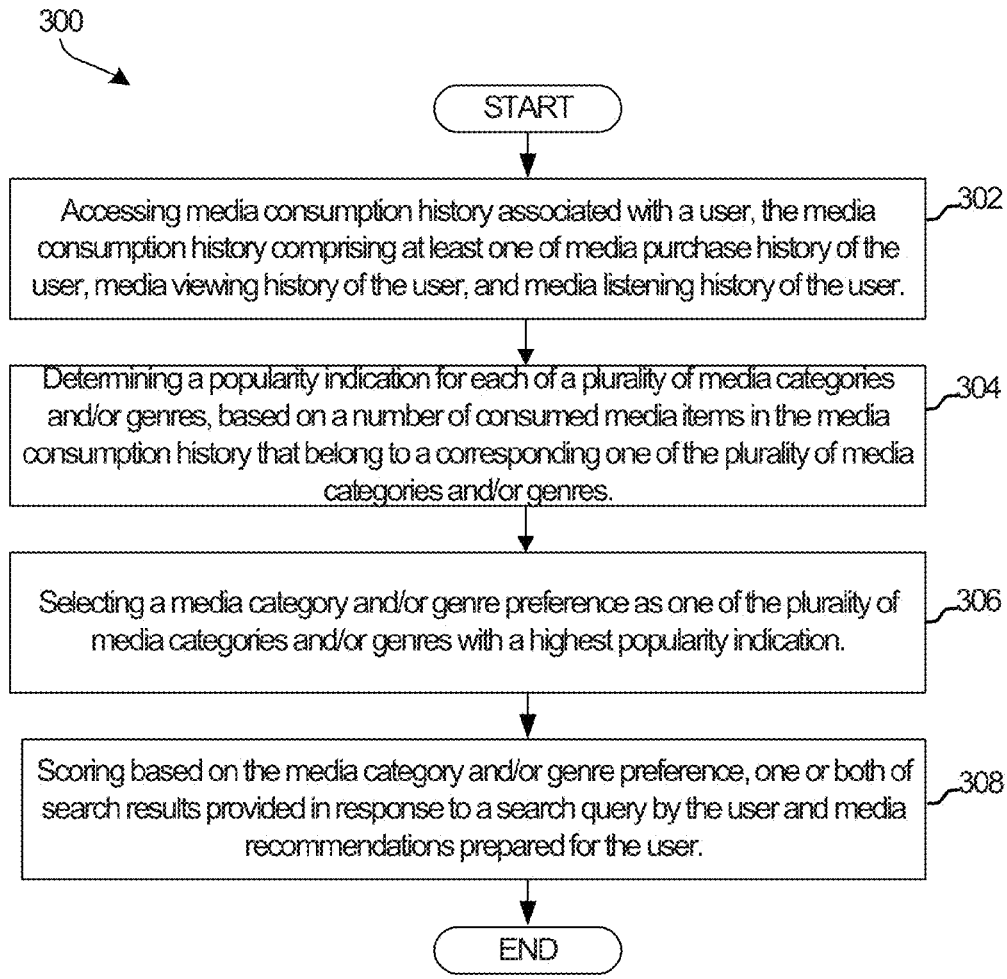
FIG. 3 is a flow chart illustrating example steps of a method for extracting user preferences, in accordance with an example embodiment of the disclosure.

FIG. 3 is a flow chart illustrating example steps of a method for extracting user preferences, in accordance with an example embodiment of the disclosure. Referring to FIGS. 2-3, the example method 300 may start at 302, when the category/genre preference extraction module 206 may access media consumption history (and/or media purchase history) associated with a user (e.g., database 204). The media consumption history may include at least one of media purchase history of the user and/or media viewing history of the user (as stored in the database 204). At 304, the CPU 203 and/or the category/genre preference extraction module 206 may determining a popularity indication for each of a plurality of media categories and/or genres, based on a number of consumed media items in the media consumption history that belong to a corresponding one of the plurality of media categories and/or genres. At 306, the CPU 203 and/or the category/genre preference extraction module 206 may select a media category and/or genre preference as one of the plurality of media categories and/or genres with a highest popularity indication. At 308, search results provided in response to a search query by the user and/or digital media recommendations prepared for the user may be scored based on the media category and/or genre preference stored in the user's category/genre preference database 208.

Figure 4:
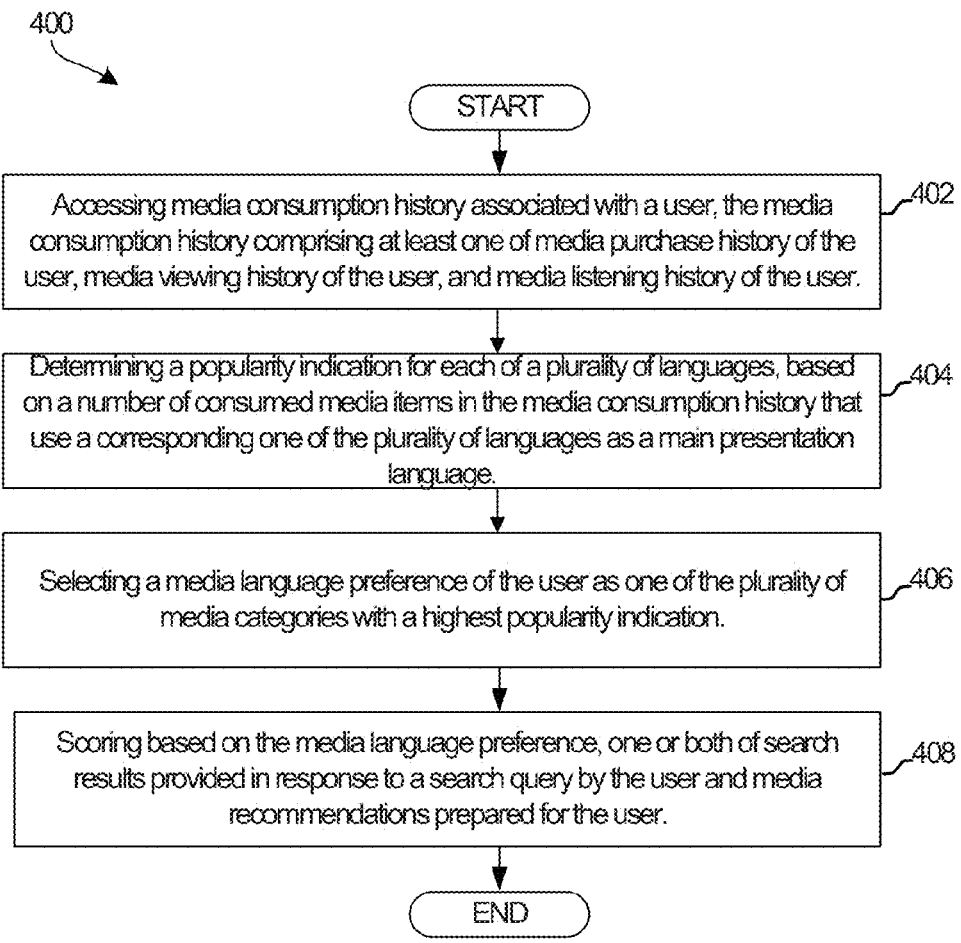
FIG. 4 is a flow chart illustrating example steps of another method for extracting user preferences, in accordance with an example embodiment of the disclosure.

FIG. 4 is a flow chart illustrating example steps of another method for extracting user preferences, in accordance with an example embodiment of the disclosure. Referring to FIGS. 1 and 4, the example method 400 may start at 402, when the language preference extraction module 106 may access media consumption history (and/or media purchase history) associated with a user (e.g., database 104). The media consumption history may include at least one of media purchase history of the user and/or media viewing history of the user (as stored in the database 104).

At 404, the CPU 103 and/or the language preference extraction module 106 may determining a popularity indication for each of a plurality of languages (associated with a given digital media), based on a number of consumed media items in the media consumption history that use a corresponding one of the plurality of languages as a main presentation language. At 406, the CPU 103 and/or the language preference extraction module 106 may select a media language preference as one of the plurality of media languages with a highest popularity indication. At 408, search results provided in response to a search query by the user and/or digital media recommendations prepared for the user may be scored based on the media language preference stored in the user's language preference database 108.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for determining media consumption preferences.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
    accessing, from a memory, media consumption history associated with a user, the media consumption history comprising at least one of media purchase history of the user, media viewing history of the user, or media listening history of the user;
    selecting, by a processor, a first media category preference of the user for a first type of media and a second media category preference of the user for a second type of media, the first media category preference being different from the second media category preference, each of the first media category preference and the second media category preference being selected from a plurality of media categories based on a popularity indication determined for a respective media category of the plurality of media categories, wherein the popularity indication for the respective media category of the plurality of media categories is based on a number of consumed media items in the media consumption history that belong to the respective media category;
    scoring, by the processor, based on the first media category preference or the second media category preference, at least one of search results provided in response to a search query by the user or media recommendations prepared for the user; and
    providing to the user at least one of the search results according to a score of the search results or the media recommendations according to a score of the media recommendations.

2. The method according to claim 1, wherein the first media category preference or the second media category preference comprises a media genre preference.

3. The method according to claim 1, wherein media of the media consumption history comprises at least one of a video, a movie, a TV show, a book, a magazine, a newspaper, an audio recording, or a music album.

4. The method according to claim 1, wherein the first media category preference or the second media category preference includes a highest popularity indication.

5. A method, comprising:
    accessing, from a memory, media consumption history associated with a user, the media consumption history comprising at least one of media purchase history of the user, media viewing history of the user, or media listening history of the user;
    selecting, by a processor, a first media language preference of the user for a first type of media and a second media language preference of the user for a second type of media, the first media language preference being different from the second media language preference, each of the first media language preference and the second media language preference being selected from a plurality of media languages based on a popularity indication determined for a respective media language of the plurality of media languages, wherein the popularity indication for the respective media language of the plurality of media languages is based on a number of consumed media items in the media consumption history that use the respective media language as a main presentation language;
    scoring, by the processor, based on the first media language preference or the second media language preference, at least one of search results provided in response to a search query by the user or media recommendations prepared for the user; and providing to the user at least one of the search results according to a score of the search results or the media recommendations according to a score of the media recommendations.

6. The method according to claim 5, wherein media of the media consumption history comprises at least one of a video, a movie, a TV show, a book, a magazine, a newspaper, an audio recording, or a music album.

7. The method according to claim 5, wherein the first media language preference or the second media language preference includes a highest popularity indication.

8. A system, comprising:
a network device comprising at least one processor coupled to a memory, the network device operable to:
   access, via the memory, media consumption history associated with a user, the media consumption history comprising at least one of media purchase history of the user, media viewing history of the user, or media listening history of the user;
   select, by a processor, a first media category preference of the user for a first type of media and a second media category preference of the user for a second type of media, the first media category preference being different from the second media category preference, each of the first media category preference and the second media category preference being selected from a plurality of media categories based on a popularity indication determined for a respective media category of the plurality of media categories, wherein the popularity indication for the respective media category of the plurality of media categories is based on a number of consumed media items in the media consumption history that belong to the respective media category of the plurality of media categories;
   score, by the at least one processor, based on the first media category preference or the second media category preference, at least one of search results provided in response to a search query by the user or media recommendations prepared for the user; and
   provide to the user at least one of the search results according to a score of the search results or the media recommendations according to a score of the media recommendations.

9. The system according to claim 8, wherein the first media category preference or the second media category preference comprises a media genre preference.

10. The system according to claim 8, wherein media of the media consumption history comprises at least one of a video, a movie, a TV show, a book, a magazine, a newspaper, an audio recording, or a music album.

11. The system according to claim 8, wherein the first media category preference or the second media category preference includes a highest popularity indication, wherein the first media category preference or the second media category preference includes a highest popularity indication.

12. A system, comprising:
a network device comprising at least one processor coupled to a memory, the network device operable to:
   access, via the memory, media consumption history associated with a user, the media consumption history comprising at least one of media purchase history of the user, media viewing history of the user, or media listening history of the user;
   select, by the at least one processor, a first media language preference of the user for a first type of media and a second media language preference of the user for a second type of media, the first media language preference being different from the second media language preference, each of the first media language preference and the second media language preference being selected from a plurality of media languages based on a popularity indication determined for a respective media language of the plurality of media languages, wherein the popularity indication for the respective media language of the plurality of media languages is based on a number of consumed media items in the media consumption history that use the respective media language of the plurality of media languages as a main presentation language;
   score, by the processor, based on the first media language preference or the second media language preference, at least one of search results provided in response to a search query by the user or media recommendations prepared for the user; and
   provide to the user at least one of the search results according to a score of the search results or the media recommendations according to a score of the media recommendations.

13. The system according to claim 12, wherein media of the media consumption history comprises at least one of a video, a movie, a TV show, a book, a magazine, a newspaper, an audio recording, or a music album.

14. The system according to claim 12, wherein the first media language preference or the second media language preference includes a highest popularity indication.

* * * * *